United States Patent Office 3,549,714
Patented Dec. 22, 1970

3,549,714
6-OCTENE-1-YNES AND HYDROGENATED PRODUCTS THEREOF
Roman Marbet, Riehen, Switzerland, assignor, by mesne assignments, to Givaudan Corporation, Clifton, N.J., a corporation of New Jersey
No Drawing. Original application Oct. 8, 1964, Ser. No. 402,622. Divided and this application Mar. 21, 1968, Ser. No. 714,759
Int. Cl. C07c *33/04;* C11b *9/00*
U.S. Cl. 260—632     1 Claim

ABSTRACT OF THE DISCLOSURE

This invention is directed to 6-octene-1-ynes and hydrogenated products thereof, which are useful as odorants in perfumes and other scented compositions.

CROSS REFERENCE TO RELATED APPLICATION

This application is a divisional application of Ser. No. 402,622, filed Oct. 8, 1964, and now abandoned.

DETAILED DESCRIPTION

The compounds of this invention have the general formula

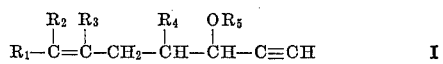

in which $R_1$ represents a hydrocarbon residue or an oxygen-containing hydrocarbon residue; $R_2$ represents a lower alkyl group; $R_3$ represents a hydrogen atom or a lower alkyl group; $R_4$ represents a hydrogen atom or a lower hydrocarbon residue; $R_5$ represents a hydrogen atom or the acyl residue of either a lower aliphatic or aromatic carboxylic acid; and wherein $R_1$ and $R_2$, taken together, represents a ring structure. Additionally, the invention embraces the 1,2-dihydro derivatives, the 1,1,2,2-tetrahydro derivatives and the hexahydro derivatives of such compounds. The expression "hexahydro derivatives," as used herein, denotes 1,1,2,2,6,7-hexahydro derivatives.

Thus, the invention encompasses the compounds of Formula I, as well as the 1,2-dihydro derivatives thereof having the formula

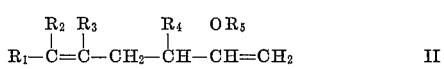

the 1,2-tetrahydro derivatives having the formula

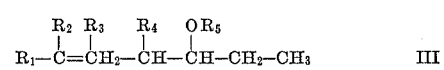

and the hexahydro derivatives having the formula

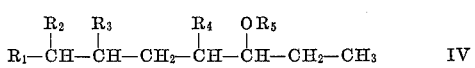

In each of the Formulas II, III and IV, the symbols $R_1$, $R_2$, $R_3$, $R_4$ and $R_5$ have the same meaning as in Formula I, with the proviso, however, that in Formula IV the symbols $R_1$ and $R_4$ represent saturated residues only.

The hydrocarbon residue which, in Formulas I to IV, is represented by the symbol $R_1$, includes saturated and, in Formulas I to III, also unsaturated hydrocarbon residues, either straight chain or branched chain, having from 1 to 10 carbon atoms. The preferred compounds of the invention contain a lower alkyl or a lower alkenyl group, either straight or branched chain, as the $R_1$ substituent. Such groups include, for example, methyl, ethyl, propyl, isopropyl, butyl, isobutyl, 4-methylpenten-(3)-yl, etc. The oxygen-containing hydrocarbon residues which, in Formulas I to IV, are also represented by the symbol $R_1$ include alkyl and alkenyl groups, of the type heretofore mentioned, having an oxygen-containing substituent. Thus, the symbol $R_1$ represents, for example, a hydrocarbon residue having a free hydroxy group or an esterified or etherified hydroxy group, an oxo group or a free or esterified carboxyl group. Exemplary of the esterified hydroxy groups which may be present in the $R_1$ residue are, for example, acyloxy groups, the acyl residue of which is derived either from a lower aliphatic carboxylic acid or from an aromatic carboxylic acid, such as, formic acid, acetic acid, propionic acid, butyric acid, benzoic acid, etc. The etherified hydroxy groups which, in Formulas I to IV, are represented by the symbol $R_1$ are exemplified, particularly, by the lower alkoxy groups, such as, methoxy, ethoxy, propoxy, isopropoxy, etc. radicals, as well as by aryloxy groups, such as, the phenoxy radical. Additional examples of the radicals which are represented by the symbol $R_1$ in Formulas I to IV are aromatic or araliphatic hydrocarbon residues, particularly, phenyl, benzyl and phenethyl groups, as well as derivatives of such compositions having oxygen-containing substituents of the type heretofore mentioned.

The lower alkyl groups which are represented in Formulas I to IV by the symbol $R_2$ are alkyl groups having from 1 to 6 carbon atoms. More specifically, the symbol $R_2$ represents methyl, ethyl, propyl, butyl, etc. radicals. Preferably, the symbol $R_2$ represents a methyl group. The lower alkyl groups which are represented in Formulas I to IV by the symbol $R_5$ include alkyl groups having from 1 to 6 carbon atoms, such as, methyl, ethyl, propyl, butyl, etc. groups. The preferred compounds of the invention contain, however, a hydrogen atom or a methyl group as the $R_5$ substituents.

The hydrocarbon residues which, in Formulas I to IV, are represented by the symbol $R_4$ include alkyl, cycloalkyl, aryl or aralkyl groups having from 1 to 8 carbon atoms. In Formulas I to III the symbol $R_4$ also represents an alkenyl group having up to 8 carbon atoms. The preferred compounds of the invention contain, however, a methyl, ethyl, propyl, allyl, cyclohexyl, pentyl, phenyl or benzyl group as the $R_4$ substituent.

As indicated heretofore, the symbols $R_1$ and $R_2$, taken together, represent a closed ring structure. As examples of such rings, there can be mentioned, carbocycle 5- and 6-member rings. More specifically, $R_1$ and $R_2$, taken together, represent, for example, tetramethylene or pentamethylene groups.

The acyl residues of either lower aliphatic carboxylic acids or aromatic carboxylic acids which, in Formulas I to IV, are represented by the symbol $R_5$ are residues derived preferably from monocarboxylic acids containing from 1 to 8 carbon atoms. Thus, for example, one class of compounds which is produced in a preferred embodiment of this invention contain acyl residues derived from straight or branched chain alkane monocarboxylic acids containing from 1 to 8 carbon atoms, such as, formic acid, acetic acid, propionic acid, butyric acid, isobutyric acid, etc. A second class of preferred compounds contain, as the $R_5$ substituent, an acyl residue derived from an aromatic carboxylic acid, preferably, a residue derived from a benzene monocarboxylic acid which may be substituted with an amino or hydroxy group. Acids of this type include benzoic acid, anthranilic acid, salicylic acid, etc. A third class of preferred compounds contain, as the $R_5$ acyl substituent, an acyl residue derived from an araliphatic monocarboxylic acid, such as, phenyl acetic acid.

The total number of carbon atoms present in the compounds of Formulas I to IV, preferably, will not amount to more than eighteen.

The compounds of Formulas I to IV, inclusive, are readily produced. In the preparative method, an aldehyde having the formula $$R_1-\underset{|}{C}=\underset{|}{C}-CH_2-\underset{|}{C}H-CHO \qquad V$$
$$\phantom{R_1-}R_2\phantom{=}R_3\phantom{-CH_2-}R_4$$

in which the symbols $R_1$, $R_2$, $R_3$ and $R_4$ have the same significance as in Formula I is ethynylated to yield the alcohol having the formula:

$$R_1-\underset{|}{C}=\underset{|}{C}-CH_2-\underset{|}{C}H-\underset{|}{C}H-C\equiv CH \qquad VI$$
$$\phantom{R_1-}R_2\phantom{=}R_3\phantom{-CH_2-}R_4\phantom{-C}OH$$

in which $R_1$, $R_2$, $R_3$ and $R_4$ have the same significance as in Formula I the alcohol of Formula VI corresponds to the Formula I compound in which $R_5$ is hydrogen. The alcohol of Formula VI can be hydrogenated to the 1,2-dihydro, 1,2-tetrahydro or hexahydro derivatives and/or esterified with a compound yielding a desired $R_5$ acyl residue.

The ethynylation of the starting γ,δ-unsaturated aldehydes to form the secondary acetylene-carbinols of Formula VI can be carried out by methods known per se. However, the reaction of the aldehydes with the acetylene reactant is accomplished, most conveniently, in liquid ammonia, under pressure if necessary, in the presence of sodium or lithium. In the alternative, the ethynylation reaction can be accomplished by reacting the starting alcohol with an acetylene Grignard compound.

The acetylene-carbinols of Formula VI which are obtained in the ethynylation step of the procedure can be hydrogenated to provide the 1,2-dihydro, or 1,2-tetrahydro or hexahydro derivatives. Such hydrogenated compounds can be esterified, subsequently, with a compound yielding the $R_5$ acyl residue. In an alternate embodiment of the invention, the acetylene-carbinols of Formula VI can be esterified and, if desired, subsequently hydrogenated.

The acetylene-carbinols of Formula VI are converted into the corresponding vinyl-carbinols by partial hydrogenation whereby the acetylenic triple bond is converted to an ethylenic double bond. Partial hydrogenation of the acetylene-carbinol to the 1,2-dihydro derivatives can be accomplished using catalytically activated hydrogen in the presence of selectively-acting hydrogenation catalysts. Thus, for example, the desired partial hydrogenation can be carried out using a palladium (5%)-calcium carbonate catalyst, partially deactivated with lead, as described by Lindlar in Helvetica Chimica Acta, 1952, 35, 446, with the addition of quinoline. In order to minimize the possibility that the compound will be over-hydrogenated, it is advantageous to use an equimolar amount of hydrogen. It will be fully understood, however, that the partial hydrogenation of the acetylene-carbinol to the 1,2-dihydro derivative can be carried out using catalysts other than that referred to heretofore. Other catalysts which are fully suited for use include, for example, palladium-carbon catalysts containing 4% of metal deactivated by absorption of quinoline. Furthermore, colloidal palladium or Raney-iron can be used as the catalyst in the partial hydrogenation procedure.

By means of the complete hydrogenation of the acetylenic triple bond there can be obtained from the acetylenic-carbinols of Formula VI the corresponding ethyl-carbinols. Complete hydrogenation of the acetylenic triple bond to produce the 1,2-tetrahydro compound is accomplished by means of the use of catalytically activated hydrogen. In the hydrogenation process there can be used, for example, as the catalyst, palladium in glacial acetic acid, Raney-nickel or the aforementioned Lindlar catalyst, without the addition of quinoline. By carrying out the hydrogenation in this manner the double bond at the 6,7-position of the chain is preserved. This reaction is advantageously carried out in the presence of a suitable solvent, such as, petroleum ether or methanol. The 1,2-tetrahydro derivatives can also be obtained from the 1,2-dihydro derivatives, that is, from the vinyl carbinols, in a corresponding manner.

Complete hydrogenation of the ethynyl group to the ethyl group, accompanied by the hydrogenation of the double bond at the 6,7-position of the chain, results in the production of hexahydro derivatives of this invention. In order to accomplish the production of the hexahydro compounds, the hydrogenation is carried out, for example, in the presence of a noble-metal catalyst in 95% alcohol or in the presence of Raney-nickel. It has been found to be advantageous, however, to hydrogenate first the triple bond completely and, subsequently, to hydrogenate the double bond at the 6,7-position. Finely divided palladium oxide-hydroxide on carbon, using petroleum ether as the solvent, has been found to be particularly advantageous for use in effecting the catalytic hydrogenation of the double bond in the 6,7-position after the ethynyl group has been converted to the corresponding ethyl group.

In the practice of this invention, the esters of the acetylene-carbinols of Formula VI can be converted directly into their 1,2-dihydro, 1,2-tetrahydro or hexahydro derivatives in the manner described heretofore. Thus, for example, the hydrogenated esters can be obtained by first esterifying the acetylene-carbinol and, subsequently, hydrogenating the resulting ester. As a general rule, carrying out the described reactions in this particular sequence is not critical. However, such sequence is recommended where the possibility exists that the 3-hydroxyl group may be removed under the hydrogenation conditions in use. Thus, in certain instances at least, it is advisable to produce the hydrogenated carbinols by first esterifying the acetylene carbinols of Formula VI, subsequently catalytically hydrogenating the esters thus obtained, and finally, converting the hydrogenated esters to the desired free carbinol compound by saponification.

The esterification of the acetylene-carbinols of Formula VI or, in the alternative, the esterification of the 1,2-dihydro, 1,2-tetrahydro or hexahydro derivatives thereof, can be effected in a manner known per se. Thus, for example, the desired esterification can be accomplished by reacting the carbinol with a compound yielding the desired $R_5$ acyl residue. More specifically, esterification can be effected by the reaction of the carbinol with an appropriate acid anhydride, such as, acetic anhydride, propionic anhydride, etc., in the presence of an acid esterification catalyst, such as, sulfuric acid, phosphoric acid, or p-toluene sulfuric acid. In the alternative, the esterification can be carried out by reacting the carbinol with an appropriate acid halide, and more specifically an appropriate acid chloride, such as, benzyl chloride, in the presence of a tertiary base such as pyridine, picoline, etc. Ketene can also be used as the esterification agent in the manufacture of the acetates.

The aldehydes of Formula V, which are used as the starting materials in the practice of this invention, can be readily prepared. The preparative method involves the acid catalysed condensation of a tertiary allyl alcohol having the formula $$R_1-\underset{\underset{OH}{|}}{\underset{|}{C}}-\underset{|}{C}=CH_2 \qquad VII$$
$$\phantom{R_1-}R_2\phantom{-}R_3$$

with an aldehyde enolether having the formula $$\underset{|}{H}C=CH-OR_3 \qquad VIII$$
$$R$$

with the splitting off of the $R_2OH$ radical. In each of the Formulas VII and VIII the symbols $R_1$, $R_2$, $R_3$ and $R_4$ have the same meaning as in Formula I.

The compounds of this invention are characterized particularly by a fine and, at times, totally unexpected fragrance. Hence, they are used as odorants in perfumes and other scented compositions. It has been found, unexpectedly, that the odor notes of the compounds produced in the practice of this invention are completely different from those of compounds having a somewhat related structure.

Thus, for example, the known 3-hydroxy-3,7-dimethyl-1,6-octadiene, that is, linalool, is recognized as having a fresh flowery odor, resembling that of lilies of the valley and roses. In contrast, the 3-hydroxy-7-methyl-1,6-octadiene of this invention has an agreeably harsh fruit-like odor. Moreover, the 3-hydroxy-4,7-dimethyl-1,6-octadiene of this invention has a fragrance which is completely different from that of linalool. This compound is characterized by its fine, fresh-grassy odor, reminiscent of that of gardenia. Similar differences have been found upon comparing the odor-notes of the acetates of the aforementioned carbinols. The odor of the presently disclosed 3-acetoxy-7-methyl-1,6-octadiene differs significantly from that of the known linalyl acetate. The former has a fresh-spicy, carraway-like note whereas the latter has a fresh fruity odor resembling Bergamotte, slightly flowery and lavender-like. The 3-acetoxy-4,7-dimethyl-1,6-octadiene of this invention, in contrast, has a very fine green note resembling gardenia. Furthermore, the compounds of this invention, which have a methyl group in the 4-position, that is, where $R_4$ is methyl, are particularly and uniquely distinguished from related compounds of the linalool series by their increased adhesion. The manner in which the compounds of this invention are used as odorants in the manufacture of perfumes and scented compositions is conventional and will be readily apparent to persons skilled in the art.

For a fuller understanding of the nature and objects of this invention, reference may be had to the following examples which are given merely as further illustrations of the invention and are not to be construed in a limiting sense.

EXAMPLE 1

(a) In this example, 46.0 grams of sodium were stirred in 1.0 liter of liquid ammonia for thirty minutes under Dry-Ice cooling. Thereafter, a stream of acetylene was conducted into the blue liquid for about thirty minutes until the color of the dark-blue solution suddenly changed to grey. Acetylene was conducted into the liquid for an additional period of about one hour, following which the mixture was treated, over a period of about thirty minutes, with a solution of 224 grams of 5-methyl-4-hexen-l-al in 1.0 liter of absolute ether. Acetylene was conducted through the reaction mixture for a period of two hours and then the mixture was treated, over a period of about thirty minutes, with 120 grams of ammonium chloride. Ammonia was then evaporated off by heating the reaction mixture, on a water-bath, at a temperature of about 30° C. The reaction mixture was subsequently filtered to remove the sodium chloride which separated therefrom. The reaction mixture was thoroughly washed with ether and, subsequently, the ether was removed by evaporation. The residual oil was distilled at 20 mm. There was thus obtained 3-hydroxy-7-methyl-6-octen-1-yne in the form of a colorless oil; boiling point at 100° C./20 mm.; $n_D^{20}=1.4679$; odor: agreeable, fresh-fruitlike.

(b) 55 grams of acetic acid anhydride were mixed with 120 mg. of p-toluenesulphonic acid and 69 grams of 3-hydroxy-7-methyl-6-oceten-1-yne produced as described in paragraph (a) of this example. The temperature of the reaction mixture rose, exothermically, to about 64° C. The mixture was allowed to stand for a period of about four hours and then 250 ml. of petroleum ether was added thereto. Thereafter, the mixture was washed twice, using 500 ml. of water each time and once using 500 ml. of 10% sodium bicarbonate solution. After evaporation of the petroleum ether, the residue was distilled at 20 mm. to obtain 3-acetoxy-7-methyl-6-octen-1-yne in the form of a colorless oil; boiling point at 106° C./90 mm.; $n_D^{20}=1.4538$; odor: grassy-herby having a carraway- and a slight terpene-note.

(c) 69 grams of 3-hydroxy-7-methyl-6-octen-1-yne, produced as described in paragraph (a) of this example, in 300 ml. of petroleum ether were hydrogenated, in the presence of 7 ml. of quinoline and 7 grams of Lindlar-catalyst, under normal conditions until 11.2 liters of hydrogen had been consumed. This occurred over a period of about thirty minutes. Thereafter, the catalyst was filtered off and the petroleum ether solution was washed with 250 ml. of 10% sulfuric acid to remove the quinoline. The residue, which remained after evaporation of the petroleum ether, was distilled at 16 mm. There was, thus obtained, 3-hydroxy-7-methyl-1,6-octadiene; boiling point at 90° C./16 mm.; $n_D^{20}=1.4630$; odor: agreeable harsh-fruitlike.

(d) 56 grams of acetic acid anhydride were mixed with 70 grams of 3-hydroxy-7-methyl-1,6-octadiene after the addition of one drop of concentrated sulfuric acid. The 1,6-octadiene starting material was prepared as described in paragraph (c) of this example. The mixture was heated to a temperature of 80° C. and it was held at that temperature for a period of about one hour. Thereafter, the reaction mixture was cooled and worked up in the manner described in paragraph (b) of this example. There was, thus obtained, 3-acetoxy-7-methyl-1,6-octadiene; boiling point at 97° C./18 mm.; $n_D^{20}=1.4467$; odor: fresh-spicy, carraway-like.

EXAMPLE 2

(a) 252 grams of 2,5-dimethyl-4-hexen-1-al were ethynylated in 1 liter of liquid ammonia in the presence of 46 g. of sodium by the method described in Example 1(a). There was obtained 3-hydroxy-4,7-dimethyl-6-octen-1-yne as a colorless liquid; boiling point at 42° C./0.01 mm.; $n_D^{20}=1.4693$; odor: fresh grassy, slightly herby.

(b) A solution of 120 mg. of p-toluene sulphonic acid in 55 grams of acetic acid anhydride was mixed with 56 grams of 3-hydroxy-4,7-dimethyl-6-octen-1-yne. The latter was prepared as described in paragraph (a) of this example. The mixture was heated to a temperature of about 80° C. and retained at that temperature for a period of about one hour. The mixture was then cooled to room temperature, following which it was worked up in the manner described in Example 1(b). There was, thus obtained, pure 3-acetoxy-4,7-dimethyl-6-octen-1-yne in the form of a colorless liquid; boiling point at 60° C./0.15 mm.; $n_D^{20}=1.4546$; odor: fine, grassy-harsh, gardenia-perfume.

(c) 76 grams of 3-hydroxy-4,7-dimethyl-6-octen-1-yne, produced as described in paragraph (a) of this example, was hydrogenated in 350 ml. of petroleum ether in the presence of 7.6 ml. of quinoline and 7.6 grams of Lindlar-catalyst under normal conditions using 11.2 liters of hydrogen. The reaction mixture was worked up, in the manner described in Example 1(c), to obtain pure 3-hydroxy-4,7-dimethyl-1,6-octadiene in the form of a colorless oil; boiling point at 93° C./16 mm.; $n_D^{20}=1.4652$; odor: fine, fresh, grassy odor resembling gardenia.

(d) A mixture of 44.5 grams of acetic acid anhydride and 61 grams of 3-hydroxy-4,7-dimethyl-1,6-octadiene, containing two drops of concentrated sulfuric acid was heated to a temperature of about 80° C. for a period of about 15 minutes. The reaction mixture was, thereafter, worked up in the manner described in Example 1(b). There was obtained pure 3-acetoxy-4,7-dimethyl-1,6-octadiene in the form of a colorless liquid, boiling point at 103° C./17 mm.; $n_D^{20}=1.4498$. The compound had a very fine and green odor, resembling gardenia. The 3-hydroxy-4,7-dimethyl-1,6-octadiene starting material was produced as described in paragraph (c) of this example.

The esters of 3-hydroxy-4,7-dimethyl-1,6-octadiene, named hereinafter, were obtained by a procedure corresponding to that described in paragraph (d) of this example:

3-propionyloxy-4,7-dimethyl-1,6-octadiene; boiling point at 69° C./0.08 mm.; $n_D^{20}=1.4458$. The compound was characterized by its very fine, soft, gardenia-perfume having a mushroom-like side-note.

3-isobutyryloxy-4,7-dimethyl-1,6-octadiene; boiling point at 79° C./0.1 mm.; $n_D^{20}=1.4438$; odor: fresh valerian- and mushroom-like, faintly fruit-like; especially agreeable in after-odor.

3-benzoyloxy-4,7-dimethyl-1,6-octadiene; boiling point at 127° C./0.05 mm.; $n_D^{20}=1.5112$; odor: faint, harsh-balsamic ordor.

(e) 76 grams of 3-hydroxy-4,7-dimethyl-6-octene-1-yne, produced as described in paragraph (a) of this example, was hydrogenated in 350 ml. of petroleum ether in the presence of 7.6 g. of Lindlar-catalyst until 22.4 liters of hydrogen had been consumed. After working up the reaction mixture in the manner described in Example 1(c), there was obtained 3-hydroxy-4,7-dimethyl-6-octene in the form of a colorless liquid; boiling point at 95° C./16 mm.; $n_D^{20}=1.4539$; odor: fresh, fine, citric-like. The same product was obtained by the hydrogenation of the acetylene-carbinol in acetone using 5% palladium-carbon catalyst.

(f) 55 grams of acetic acid anhydride were heated at a temperature of 80° C. for a period of about thirty minutes together with 150 mg. of p-toluenesulphonic acid and 78 grams of 3-hydroxy-4,7-dimethyl-6-octene. The latter reagent was prepared in the manner set forth in paragraph (e) of this example. After the working up of the reaction mixture as described in Example 1(b) there was obtained pure 3-acetoxy-4,7-dimethyl-6-octene in the form of a colorless liquid; boiling point at 103° C./16 mm.; $n_D^{20}=1.4402$; ordor: agreeably fresh, green-herby, slightly gardenia-like.

The esters of 3-hydroxy-4,7-dimethyl-6-octene named hereinafter were obtained by a procedure analogous to that described in paragraph (f) of this example:

3-propyionyloxy-4,7-dimethyl-6-octene; boiling point at 67° C./.03 mm.; $n_D^{20}=1.4428$; odor: slight fruit-like flowery odor.

3-isobutyryloxy-4,7-dimethyl-6-octene; boiling point at 74° C./0.02 mm.; $n_D^{20}=1.4412$; odor: fresh, having a fruit-note.

EXAMPLE 3

(a) 280 grams of 2-ethyl-5-methyl-4-hexen-1-al were treated with acetylene in 1 liter of liquid ammonia in the presence of 46 g. of sodium in the manner described in Example 1(a). After working up the reaction mixture there was obtained pure 3-hydroxy-4-ethyl-7-methyl-6-octen-1-yne in the form of a colorless liquid; boiling point at 54° C./0.01 mm.; $n_D^{20}=1.4713$; odor: fresh spicy, clove-like.

(b) A mixture of 55 grams of acetic acid anhydride, 250 mg. of p-toluene sulphonic acid and 83 grams of 3-hydroxy-4-ethyl-7-methyl-6-octen-1-yne was heated at a temperature of 80° C. for a period of one hour. After working up the reaction mixture in the manner described in Example 1(b), there was obtained 3-acetoxy-4-ethyl-7-methyl-6-octen-1-yne; boiling point at 78° C./0.2 mm.; $n_D^{20}=1.4576$; odor: herby terpene-like.

(c) 83.1 grams of 3-hydroxy-4-ethyl-7-methyl-6-octen-1-yne, produced as described in paragraph (a) of this example, was hydrogenated in 350 ml. of petroleum ether in the presence of 8.3 grams of Lindlar-catalyst using 11.2 liters of hydrogen. After working up the reaction mixture in the manner described in Example 1(c) there was obtained pure 3-hydroxy-4-ethyl-7-methyl-1,6-octadiene in the form of a colorless liquid; boiling point at 104° C./16 mm.; $n_D^{20}=1.4684$; odor: fresh, spicy, clove-like.

(d) 46 grams of acetic acid anhydride were heated at a temperature of 80° C. for a period of thirty minutes together with 0.5 gram of phosphoric acid and 70 grams of 3-hydroxy-4-ethyl-7-methyl-1,6-octadiene. The latter reagent was produced as described in paragraph (c) of this example. After working up the reaction mixture by the procedure described in Example 1(b) there was obtained 3-acetoxy-4-ethyl-7-methyl-1,6-octadiene in the form of a colorless oil; boiling point at 76° C./0.15 mm.; $n_D^{20}=1.4531$; odor: fresh terpene-like, slightly spicy, after-odor agreeably gardenia-like.

(e) 83 grams of 3-hydroxy-4-ethyl-7-methyl-6-octen-1-yne, produced as described in paragraph (a) of this example, were hydrogenated in 350 ml. of petroleum ether in the presence of 8.3 g. of Lindlar-catalyst for a period of about three hours until a total of about 23 liters of hydrogen had been consumed. After the reaction mixture had been worked up in the manner described in Example 1(c), there was obtained 3-hydroxy-4-ethyl-7-methyl-6-octene in the form of a colorless oil; boiling point at 70° C./0.01 mm.; $n_D^{20}=1.4580$; odor: fresh, fine spicy, slightly flowery.

(f) A mixture of 48 grams of acetic acid anhydride, 130 mg. of p-toluenesulphonic acid and 75 grams of 3-hydroxy-4-ethyl-7-methyl-octene was heated at a temperature of 80° C. for a period of about ninety minutes. After the reaction mixture had been worked up in the manner described in Example 1(b), there was obtained pure 3-acetoxy-4-ethyl-7-methyl-6-octene; boiling point at 75° C./0.01 mm.; $n_D^{20}=1.4438$; odor: very fresh harsh-herby, slightly flowery.

(g) 100 grams of 3-hydroxy-4-ethyl-7-methyl-6-octene, produced as described in paragraph (e) of this example, were hydrogenated in 450 ml. of petroleum ether in the presence of 10 grams of palladium/carbon 5% catalyst (finely divided palladium oxide/hydroxide on carbon) until 14 liters of hydrogen had been taken up. This was accomplished over a period of about ninety minutes. After filtration of the reaction mixture, under nitrogen, to effect the removal of the catalyst, the filtrate was evaporated and the residue was purified by distillation. There was thus obtained 3-hydroxy-4-ethyl-7-methyl-octene; boiling point at 62° C./0.02 mm.; $n_D^{20}=1.4404$; odor: fresh flowery-fruitlike odor resembling gooseberries having a herby side-note.

(h) 32 grams of 3-hydroxy-4-ethyl-7-methyl-octane, produced as described in the preceding paragraph, were heated at a temperature of 80° C. for thirty minutes together with a solution of 100 mg. of p-toluenesulphonic acid in 21 grams of acetic acid anhydride. The reaction mixture was worked up in the manner described in Example 1(b) to yield pure 3-acetoxy-4-ethyl-7-methyl-octane in the form of a colorless oil; boiling point at 72° C./0.3 mm.; $n_D^{20}=1.4277$; odor: very fresh, herby-fruity, faintly flowery.

EXAMPLE 4

(a) 253 grams of 4,5-dimethyl-4-hexen-1-al were ethynylated in 1 liter of liquid ammonia in the presence of 46 grams of sodium in the manner described in Example 1(a). There was obtained pure 3-hydroxy-6,7-dimethyl-6-octen-1-yne in the form of a colorless oil; boiling point at 52° C./0.02 mm.; $n_D^{20}=1.4750$; odor: herby terpene-like.

(b) 55 grams of acetic acid anhydride were heated at a temperature of 80° C. for a period of about two hours together with 240 mg. of p-toluenesulphonic acid and 76 grams of 3-hydroxy-6,7-dimethyl-6-octen-1-yne. The latter reactant was produced by the method set forth in the preceding paragraph. The reaction mixture was worked up as described in Example 1(b) to yield 3-acetoxy-6,7-dimethyl-6-octen-1-yne, boiling point at 68° C./0.15 mm.; $n_D^{20}=1.4595$; odor: agreeably grassy terpene-like.

(c) 76 grams of 3-hydroxy-6,7-dimethyl-6-octen-1-yne, produced as described in paragraph (a) of this example, were dissolved in 350 ml. of petroleum other, treated with 7.6 ml. of quinoline and thereafter hydrogenated in the presence of 7.6 grams of Lindlar-catalyst until 11.2 liters of hydrogen had been consumed. The mixture was then worked up in the manner described in Example 1(c). There was, thus obtained, 3-hydroxy-6,7-dimethyl-1,6-octadiene, boiling point at 99° C./16 mm.; $n_D^{20}=1.4694$; odor: herby and fresh and fruitlike.

(d) 45 grams of acetic acid anhydride were heated at a temperature of 80° C. for a period of about fifteen minutes together with 200 mg. of p-toluenesulphonic acid and 62 grams of 3-hydroxy-6,7-dimethyl-1,6-octadiene. The reaction mixture was worked up by the procedure described in Example 1(b). There was obtained 3-acetoxy-6,7-dimethyl-1,6-octadiene, boiling point at 72° C./0.09 mm.; $n_D^{20}$=1.4534; odor: fresh woody-fruitlike, faintly flowery (gardenia). The 3 - hydroxy-6,7-dimethyl-1,6-octadiene starting material of this example was prepared by the procedure set forth in paragraph (c) of this example.

EXAMPLE 5

(a) 308 grams of 5-isobutyl-4-hexen-1-al were ethynylated in 1 liter of liquid ammonia in the presence of 46 grams of sodium in the manner described in Example 1(a) The reaction mixture was worked up as described in that example. There was obtained 3-hydroxy-7-isobutyl-6-octen-1-yne, boiling point at 69° C./0.01 mm.; $n_D^{20}$=1.4629; odor: agreeably soft, fruity-flowery.

(b) 90 grams of 3-hydroxy-7-isobutyl-6-octen-1-yne, produced as described in the preceding paragraph, was mixed with 240 mg. of p-toluenesulphonic acid and 55 grams of acetic acid anhydride. The mixture was heated at a temperature of 80° C. for a period of two hours, following which it was worked up in the manner described in Example 1(b). There was thus obtained 3-acetoxy-7-isobutyl-6-octen-1-yne, boiling point at 86° C./0.15 mm.; $n_D^{20}$=1.4546; odor: fresh and fine resembling caraway (cuminic alcohol-like).

(c) 90 grams of 3-hydroxy-7-isobutyl-6-octen-1-yne, produced as described in paragraph (a) of this example, were mixed with 350 ml. of petroleum ether and 9 ml. of quinoline. Thereafter, the mixture was hydrogenated in the presence of 9 grams of Lindlar-catalyst until a total of 11.2 liters of hydrogen had been consumed. The mixture was then worked up in the manner set forth in Example 1(c). There was obtained 3-hydroxy-7-isobutyl-1,6-octadiene, boiling point at 81° C./0.06 mm.; $n_D^{20}$=1.4613; odor: intensive warm-fruity odor, reminiscent of pineapple and apples, and very reminiscent of allyl-alpha-ionone. The odor is however, fresher and without the ionone-like components of allyl-alpha-ionone.

(d) To a solution of 200 mg. of p-toluenesulphonic acid in 48 grams of acetic acid anhydride, there was added 78 grams of 3-hydroxy-7-isobutyl-1,6-octadiene. The mixture was heated at a temperature of 80° C. for a period of fifteen minutes. After the reaction mixture was worked up as described in Example 1(b) there was obtained pure 3-acetoxy-7-isobutyl-1,6-octadiene in the form of a colorless oil; boiling point at 88° C./0.2 mm.; $n_D^{20}$=1.4494; odor: herby fruit-like, reminiscent of pineapple and apples having a metallic side-note.

EXAMPLE 6

(a) 304 grams of 4-cyclohexylidene-butanal were ethynylated in 1 liter of liquid ammonia in the presence of 46 grams of sodium in the manner described in Example 1(a). There was obtained 3-hydroxy-6-cyclohexylidene-1-hexyne, boiling point at 99° C./0.15 mm.;

$n_D^{20}$=1.5015 harsh, fruity-flowery odor.

(b) 535 grams of 3-hydroxy-6-cyclohexylidene-1-hexyne produced as described in the preceding paragraph were mixed with a solution of 1.5 grams of p-toluenesulphonic acid in 330 grams of acetic acid anhydride and the mixture was allowed to stand for a period of about fifteen hours. After the reaction mixture had been worked as described in Example 1(b), there was obtained 3-actoxy-6-cyclohexylidene-1-hexyne in the form of a yellowish oil, boiling point at 87° C./0.1 mm.; $n_D^{20}$=1.4816; odor: slightly grass-like.

(c) 169 grams of 3-acetoxy-6-cyclohexylidene-1-hexyne, produced as described in the preceding paragraph, was hydrogenated in 530 ml. of petroleum ether in the presence of 17 grams of quinoline and 17 grams of Lindlar-catalyst until 17.2 liters of hydrogen had been consumed. The reaction mixture was worked up as described in Example 1(c) to obtain 3-acetoxy-6-cyclohexylidene-1-hexene, boiling point at 97° C./0.09 mm.;

$n_D^{20}$=1.4770 odor: agreeably harsh fruitlike-woody.

The free 3-hydroxy-6-cyclohexylidene-1-hexyne was hydrogenated to 3-hydroxy-6-cyclohexylidene-1-hexene in an analogous manner. The latter compound was also obtained by saponification of the corresponding acetate as follows:

80 grams of 3-acetoxy-6-cyclohexylidene-1-hexene were treated with 80 ml. of 30% caustic soda and, subsequently, with sufficient methanol (ca. 300 ml.) to form a homogeneous solution. About 300 ml. of methanol was used for this purpose. After fifteen minutes, the solution was neutralized with glacial acetic acid, following which was the methanol evaporated off. The separated oil was taken up in petroleum ether and washed with sodium bicarbonate solution. After evaporation of the solvent the, thus-prepared, crude 3-hydroxy-6-cyclohexylidene-1-hexene was purified by distillation. The compound, boiling point at 94° C./0.02 mm.; $n_D^{20}$=1.4984, has an intensive warm-fruitlike odor, reminiscent of pineapple and apples. It is an outstanding perfume of versatile use exhibiting good adhesion.

I claim:

1. The compound, 3-hydroxy-7-isobutyl-6-octen-1-yne.

References Cited

UNITED STATES PATENTS 2,797,237   6/1957   Birbiglia et al. _____ 260—632Y

LEON ZITVER, Primary Examiner

J. E. EVANS, Assistant Examiner

U.S. Cl. X.R.

252—522; 260—469, 471, 474, 483, 488, 491, 599, 600, 601, 602, 613, 615, 617, 618, 635, 638, 642